United States Patent
Boul et al.

(10) Patent No.: US 9,920,235 B2
(45) Date of Patent: *Mar. 20, 2018

(54) CEMENT SET ACTIVATORS FOR SET-DELAYED CEMENT COMPOSITIONS AND ASSOCIATED METHODS

(71) Applicant: Halliburton Energy Services, Inc., Houston, TX (US)

(72) Inventors: Peter James Boul, Houston, TX (US); Thomas Jason Pisklak, Cypress, TX (US); Samuel J. Lewis, Spring, TX (US); Kyriacos Agapiou, Houston, TX (US); Lance Everett Brothers, Chickasha, OK (US); Pauline Akinyi Otieno, Spring, TX (US); Ronnie Glen Morgan, Waurika, OK (US); Baya Adams, Duncan, OK (US); Cody Glenn Harris, Tomball, TX (US)

(73) Assignee: Halliburton Energy Services Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,245

(22) Filed: May 23, 2016

(65) Prior Publication Data

US 2016/0280982 A1 Sep. 29, 2016

Related U.S. Application Data

(60) Division of application No. 14/090,494, filed on Nov. 26, 2013, now Pat. No. 9,371,712, and a continuation-in-part of application No. 13/854,115, filed on Mar. 31, 2013, now Pat. No. 9,227,872, which is a continuation-in-part of application No. 13/417,001, filed on Mar. 9, 2012, now Pat. No. 8,851,173.

(60) Provisional application No. 61/875,233, filed on Sep. 9, 2013.

(51) Int. Cl.
| | |
|---|---|
| *C04B 28/18* | (2006.01) |
| *C09K 8/467* | (2006.01) |
| *E21B 33/13* | (2006.01) |
| *C04B 14/06* | (2006.01) |
| *C04B 40/06* | (2006.01) |
| *C09K 8/42* | (2006.01) |
| *E21B 33/14* | (2006.01) |
| *E21B 33/138* | (2006.01) |

(52) U.S. Cl.
CPC ............ *C09K 8/467* (2013.01); *C04B 14/062* (2013.01); *C04B 28/18* (2013.01); *C04B 28/182* (2013.01); *C04B 28/184* (2013.01); *C04B 28/186* (2013.01); *C04B 28/188* (2013.01); *C04B 40/0658* (2013.01); *C09K 8/428* (2013.01); *E21B 33/13* (2013.01); *E21B 33/14* (2013.01); *E21B 33/138* (2013.01)

(58) Field of Classification Search
CPC ........ E21B 33/13; E21B 33/14; E21B 33/138; C09K 8/467; C09K 8/428; C04B 28/18; C04B 28/182; C04B 28/184; C04B 28/186; C04B 28/188; C04B 14/062; C04B 14/16; C04B 14/400658; C04B 22/147; C04B 22/16; C04B 24/003; C04B 24/006; C04B 24/163; C04B 24/18; C04B 24/22; C04B 24/2641; C04B 24/383; C04B 20/023; C04B 2103/12; C04B 2103/22; C04B 2103/408

See application file for complete search history.

(56) References Cited

U.S. PATENT DOCUMENTS

| | | |
|---|---|---|
| 2,411,793 A | 11/1946 | Kennedy |
| 2,848,051 A | 8/1958 | Williams |
| 3,238,279 A | 3/1966 | Tarlton |
| 3,557,876 A | 1/1971 | Tragesser |
| 3,699,042 A | 10/1972 | Browning et al. |
| 3,887,009 A | 6/1975 | Miller et al. |
| 3,959,003 A | 5/1976 | Ostroot et al. |
| 4,054,462 A | 10/1977 | Stude |
| 4,349,443 A | 9/1982 | Block |
| 4,350,533 A | 9/1982 | Galer et al. |
| 4,462,837 A | 7/1984 | Baker et al. |
| 4,515,216 A | 5/1985 | Childs et al. |

(Continued)

FOREIGN PATENT DOCUMENTS

| | | |
|---|---|---|
| WO | 2011-161411 | 12/2011 |
| WO | 2015034477 | 3/2015 |

OTHER PUBLICATIONS

USPTO Non-Final Office Action for U.S. Appl. No. 14/478,813 dated Sep. 30, 2016.

(Continued)

*Primary Examiner* — Anthony J Green

(74) *Attorney, Agent, or Firm* — Craig W. Roddy; Tumey L.L.P.

(57) ABSTRACT

Disclosed herein are cement compositions and methods of using set-delayed cement compositions in subterranean formations. In one embodiment, a method of cementing in a subterranean formation is described. The method may comprise providing a set-delayed cement composition comprising water, pumice, hydrated lime, and a set retarder; activating the set-delayed cement composition with a liquid additive to produce an activated cement composition, wherein the liquid additive comprises a monovalent salt, a polyphosphate, a dispersant, and water; and allowing the activated cement composition to set.

14 Claims, 3 Drawing Sheets

(56) References Cited

U.S. PATENT DOCUMENTS

| | | | |
|---|---|---|---|
| 4,519,452 A | 5/1985 | Tsao et al. | |
| 4,524,828 A | 6/1985 | Sabins et al. | |
| 4,676,832 A | 6/1987 | Childs et al. | |
| 4,818,288 A | 4/1989 | Aignesberger et al. | |
| 4,875,937 A | 10/1989 | Viles | |
| 5,058,679 A | 10/1991 | Hale et al. | |
| 5,263,542 A | 11/1993 | Brothers | |
| 5,314,022 A | 5/1994 | Cowan et al. | |
| 5,447,197 A | 9/1995 | Rae et al. | |
| 5,503,671 A | 4/1996 | Casabonne et al. | |
| 5,547,506 A | 8/1996 | Rae et al. | |
| 6,173,778 B1 | 1/2001 | Rae et al. | |
| 6,221,148 B1* | 4/2001 | Mathur | C04B 28/26 106/416 |
| 6,333,005 B1 | 12/2001 | Nguyen et al. | |
| 6,457,523 B1 | 10/2002 | Vijn et al. | |
| 6,488,762 B1 | 12/2002 | Shi | |
| 6,610,140 B1 | 8/2003 | Vijn et al. | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,199,086 B1 | 4/2007 | Roddy et al. | |
| 7,201,798 B2 | 4/2007 | Brothers et al. | |
| 7,244,303 B2 | 7/2007 | Chatterji et al. | |
| 7,338,923 B2 | 3/2008 | Roddy et al. | |
| 7,445,669 B2 | 11/2008 | Roddy et al. | |
| 7,478,675 B2 | 1/2009 | Roddy et al. | |
| 7,559,369 B2 | 7/2009 | Roddy et al. | |
| 7,572,329 B2 | 8/2009 | Liu et al. | |
| 7,575,055 B2 | 8/2009 | Reddy et al. | |
| 7,617,870 B1 | 11/2009 | Roddy et al. | |
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,048,219 B2* | 11/2011 | Woolfsmith | C04B 28/02 106/644 |
| 8,183,186 B2 | 5/2012 | Luo | |
| 8,281,859 B2 | 10/2012 | Roddy et al. | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,486,869 B2 | 7/2013 | Brenneis et al. | |
| 8,851,173 B2 | 10/2014 | Brothers et al. | |
| 9,212,534 B2 | 12/2015 | Ballew | |
| 9,227,872 B2 | 1/2016 | Boul | |
| 9,255,031 B2 | 2/2016 | Agapiou | |
| 9,255,454 B2 | 2/2016 | Lewis | |
| 9,260,343 B2* | 2/2016 | Brothers | C04B 16/00 |
| 9,328,281 B2* | 5/2016 | Agapiou | C04B 28/18 |
| 9,328,583 B2* | 5/2016 | Pisklak | C04B 28/18 |
| 9,371,712 B2* | 6/2016 | Boul | C04B 28/18 |
| 9,505,972 B2* | 11/2016 | Iverson | C04B 28/18 |
| 9,534,165 B2* | 1/2017 | Agapiou | C04B 28/18 |
| 9,580,638 B2* | 2/2017 | Boul | C04B 28/18 |
| 2002/0050232 A1 | 5/2002 | Yamashita et al. | |
| 2002/0162657 A1 | 11/2002 | Tumlin et al. | |
| 2003/0121456 A1 | 7/2003 | Griffith et al. | |
| 2003/0188669 A1 | 10/2003 | Sobolev et al. | |
| 2003/0221778 A1 | 12/2003 | Musch et al. | |
| 2004/0112600 A1 | 6/2004 | Luke et al. | |
| 2004/0127606 A1 | 7/2004 | Goodwin | |
| 2004/0211342 A1 | 10/2004 | Sprouts et al. | |
| 2004/0220484 A1 | 11/2004 | Chatterji et al. | |
| 2005/0079016 A1 | 4/2005 | Greenwood et al. | |
| 2006/0025312 A1 | 2/2006 | Santra | |
| 2006/0041060 A1 | 2/2006 | George et al. | |
| 2006/0054320 A1 | 3/2006 | Brothers et al. | |
| 2006/0166834 A1 | 7/2006 | Roddy et al. | |
| 2006/0249054 A1 | 11/2006 | Brothers et al. | |
| 2006/0249289 A1 | 11/2006 | Brothers et al. | |
| 2007/0051280 A1 | 3/2007 | Fyten | |
| 2007/0089643 A1 | 4/2007 | Roddy et al. | |
| 2007/0125534 A1 | 6/2007 | Reddy et al. | |
| 2007/0235192 A1 | 10/2007 | Michaux et al. | |
| 2007/0289744 A1 | 12/2007 | Bringamon et al. | |
| 2008/0066652 A1 | 3/2008 | Fraser et al. | |
| 2008/0169100 A1 | 7/2008 | Lewis et al. | |
| 2009/0011207 A1 | 1/2009 | Dubey | |
| 2009/0020044 A1 | 1/2009 | Constantz et al. | |
| 2009/0038800 A1 | 2/2009 | Ravi et al. | |
| 2009/0105099 A1 | 4/2009 | Warrender et al. | |
| 2009/0124522 A1 | 5/2009 | Roddy et al. | |
| 2010/0016183 A1 | 1/2010 | Roddy et al. | |
| 2010/0025039 A1 | 2/2010 | Roddy et al. | |
| 2010/0041792 A1 | 2/2010 | Roddy et al. | |
| 2010/0044043 A1 | 2/2010 | Roddy et al. | |
| 2010/0193982 A1 | 8/2010 | Genolet | |
| 2010/0258312 A1* | 10/2010 | Brenneis | C04B 28/021 166/293 |
| 2010/0270016 A1 | 10/2010 | Carelli et al. | |
| 2010/0273912 A1 | 10/2010 | Roddy et al. | |
| 2010/0282466 A1 | 11/2010 | Brenneis et al. | |
| 2010/0292365 A1 | 11/2010 | Roddy | |
| 2010/0313795 A1 | 12/2010 | Guynn et al. | |
| 2011/0017452 A1 | 1/2011 | Benkley et al. | |
| 2011/0132605 A1 | 6/2011 | Sarap et al. | |
| 2011/0162845 A1 | 7/2011 | Ravi | |
| 2011/0305830 A1 | 12/2011 | Frantz et al. | |
| 2012/0018155 A1 | 1/2012 | Patil | |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2012/0214901 A1* | 8/2012 | Bury | C04B 24/32 523/122 |
| 2012/0249552 A1 | 10/2012 | Harvill et al. | |
| 2012/0251079 A1 | 10/2012 | Meschter et al. | |
| 2012/0252304 A1 | 10/2012 | Vaughn | |
| 2012/0291674 A1 | 11/2012 | Brenneis et al. | |
| 2012/0325478 A1 | 12/2012 | Muthusamy et al. | |
| 2013/0233550 A1 | 9/2013 | Brothers | |
| 2013/0248183 A1 | 9/2013 | Pisklak | |
| 2013/0325478 A1 | 12/2013 | Matsumoto et al. | |
| 2014/0048267 A1 | 2/2014 | Pisklak et al. | |
| 2014/0090843 A1 | 4/2014 | Boul et al. | |
| 2015/0175481 A1 | 6/2015 | Pisklak | |
| 2015/0175869 A1 | 6/2015 | Agapiou | |
| 2015/0197033 A1 | 7/2015 | Agapiou | |
| 2015/0197453 A1 | 7/2015 | Pisklak | |

OTHER PUBLICATIONS

E.B. Nelson. "Well Cementing". pp. 3-2. 1990.
Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.
Rae et al., "Liquid Cement Premix Introduces New Solutions to Conventional Cementing Problems", IADC/SPE 35086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al., "New Technology Eliminates Bulking in Cementing Operations", SPE 36478, pp. 645-653, SPE, 1996 Inc., 1996.
Anderson et al., "New Technology Improves Cement Slurry Design", SPE 36973, pp. 127-136, SPE, Inc., 1996.
Shaefer et al., "Utilizing 'Over-Seas' Technology Improves the Cementing Processes in the DJ Basin of Colorado", SPE 80940, pp. 1-8, SPE, Inc., 2003.
"Liquid Stone® Cement Technology", Product Sales Bulletin, BJ Services Company, pp. 1-2, Oct. 19, 2004.

(56) References Cited

OTHER PUBLICATIONS

HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.
PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex™" dated 2007.
ThermPhos Brochure "Dequest® 2006" printed from the Internet on Mar. 25, 2013.
OFI Testing Equipment, Inc. Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics-Silikuty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Malerials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
Final Official Action for U.S. Appl. No. 14/202,625 dated Feb. 24, 2016.
Non-Final Official Action for U.S. Appl. No. 14/098,198 dated Jan. 20, 2016.
Final Official Action for U.S. Appl. No. 14/048,463 dated Jan. 14, 2016.
Canadian Office Action for Application No. 2,866,602 dated Nov. 30, 2015.
Official Action for U.S. Appl. No. 14/478,813 dated Sep. 10, 2015.
Official Action for U.S. Appl. No. 14/478,869 dated Feb. 26, 2015.
Official Action for U.S. Appl. No. 14/098,198 dated Nov. 20, 2014.
Official Action for U.S. Appl. No. 14/067,143 dated Mar. 12, 2015.
Search Report and Written Opinion for International Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US14/054794 dated Sep. 9, 2014.
Search Report and Written Opinion for International Application PCT/US14/054496 dated Sep. 8, 2014.
Search Report and Written Opinion for International Application PCT/US14/054380 dated Sep. 5, 2014.
Search Report and Written Opinion for International Application PCT/US14/067112 dated Mar. 5, 2015.
Search Report and Written Opinion for International Application PCT/US14/068804 dated Mar. 17, 2015.
U.S. Office Action for U.S. Appl. No. 13/417,001 dated Apr. 16, 2014.
HES brochure Enhancer 923™ Cement Agent, H07745 Jun. 2010.
Notice of Allnwance for U.S. Appl. No. 13/417,001 dated Mar. 9, 2012.
Search Report and Written Opinion for International Application No. PCT/US2014/032150 dated Aug. 21, 2014.
ISRWO for PCT Application No. PCT/US2015/017564 dated Jun. 6, 2015.
ISRWO for PCT Application No. PCT/US2015/019709 dated May 22, 2015.
Final Official Action for U.S. Appl. No. 14/098,198 dated Jun. 19, 2015.
Official Action for U.S. Appl. No. 14/090,573 dated Jun. 12, 2015.
Final Official Action for U.S. Appl. No. 14/478,869 dated Jun. 17, 2015.
Official Action for U.S. Appl. No. 13/854,115 dated Jul. 15, 2015.
Final Official Action for U.S. Appl. No. 14/067,143 dated Aug. 12, 2015.
Official Action for U.S. Appl. No. 14/019,730 dated Jun. 3, 2015.
Official Action for U.S. Appl. No. 14/048,486 dated Aug. 17, 2015.
Official Action for U.S. Appl. No. 14/048,463 dated Sep. 9, 2015.
Final Official Action for U.S. Appl. No. 14/019,730 dated Sep. 23, 2015.
International Search Report and Written Opinion for PCT/US15/21837 dated Jun. 23, 2015.
AkzoNobel Colloidal Silica, "Perspectives on Colloidal Silica," https://www.aksonobel.com/colloidalsilica/silica_Facts/perpectives, Jul. 9, 2015.
Official Action for U.S. Appl. No. 14/202,625 dated Oct. 21, 2015.
Official Action for U.S. Appl. No. 14/194,125 dated Oct. 16, 2015.
Official Action for U.S. Appl. No. 14/221,479 dated Sep. 30, 2015.
Official Action for U.S. Appl. No. 14/032/734 dated Sep. 24, 2015.
Notice of allowance for U.S. Appl. No. 14/090,494 dated Apr. 15, 2016.
Office Action for U.S. Appl. No. 14/090,494 dated Sep. 24, 2015.
Final Office Action for U.S. Appl. No. 14/090,494 dated Feb. 1, 2016.
Australia Patent Examination Report No. 1 for Australian Patent Application No. 2014317924 dated Jul. 20, 2016.
"How Microsilica Improves Concrete", Publication #C850327. Copyright 1985, The Aberdeen Group.
Non-final Rejection for U.S. Appl. No. 15/087,961 dated Apr. 17, 2017.

* cited by examiner

CEMENT SET ACTIVATORS FOR SET-DELAYED CEMENT COMPOSITIONS AND ASSOCIATED METHODS

CROSS-REFERENCE TO RELATED APPLICATIONS

The present application is a divisional of U.S. patent application Ser. No. 14/090,494, issued as U.S. Pat. No. 9,371,712 entitled "Cement Set Activators for Set-Delayed Cement Compositions," filed on Nov. 26, 2013, which claims priority to U.S. Provisional Patent Application No. 61/875,233, filed on Sep. 9, 2013, titled "Cement Set Activators for Set-Delayed Cement Compositions and Associated Methods", and U.S. patent application Ser. No. 14/090, 494, issued as U.S. Pat. No. 9,371,712 is also a continuation-in-part of U.S. patent application Ser. No. 13/854,115, issued as U.S. Pat. No. 9,227,872 entitled "Cement Set Activators for Set-Delayed Cement Compositions and Associated Methods," filed on Mar. 31, 2013, which is a continuation-in-part of U.S. patent application Ser. No. 13/417,001, issued as U.S. Pat. No. 8,851,173 entitled "Set-Delayed Cement Compositions Comprising Pumice and Associated Methods," filed on Mar. 9, 2012, the entire disclosures of which are incorporated herein by reference.

BACKGROUND

Embodiments relate to subterranean cementing operations and, in certain embodiments, to set-delayed cement compositions and methods of using set-delayed cement compositions in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for at least about one day (e.g., at least about 7 days, about 2 weeks, about 2 years or more) at room temperature (e.g., about 80° F.) in quiescent storage. When desired for use, the set-delayed cement compositions should be capable of being activated whereby reasonable compressive strengths are developed. For example, a cement set accelerator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in subterranean formations having lower bottom hole static temperatures.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
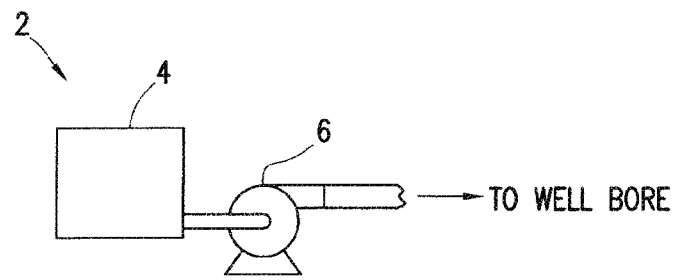
FIG. 1 illustrates a system for the preparation and delivery of a set-delayed cement composition to a wellbore in accordance with certain embodiments.

Embodiments relate to subterranean cementing operations and, in certain embodiments, to set-delayed cement compositions and methods of using set-delayed cement compositions in subterranean formations. In particular embodiments, improved cement set activators used for the activation of set-delayed cement compositions may be provided. Embodiments of the cement set activators may be used to activate a set-delayed cement composition while also achieving desirable thickening times and compressive strength development.

Embodiments of the set-delayed cement compositions may generally comprise water, pumice, hydrated lime, and a set retarder. Optionally, the set-delayed cement compositions may further comprise a dispersant. Embodiments of the set-delayed cement compositions may be foamed. Advantageously, embodiments of the set-delayed cement compositions may be capable of remaining in a pumpable fluid state for an extended period of time. For example, the set-delayed cement compositions may remain in a pumpable fluid state for at least about 1 day, about 2 weeks, about 2 years, or longer. Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water used in embodiments of the set-delayed cement compositions may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Embodiments of the set-delayed cement compositions may comprise pumice. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 microns, from about 5 microns to about 100 microns, or from about 10 microns to about 50 microns. In one particular embodiment, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Embodiments of the set-delayed cement compositions may comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the set-delayed cement compositions may comprise a set retarder. A broad variety of set retarders may be suitable for use in the set-delayed cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, the set-delayed cement compositions may have a delayed set in that they remain in a pumpable fluid state for at least one day (e.g., at least about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with an activator) to set into a hardened mass. The term "cement set activator" or "activator", as used herein, refers to an additive that activates a set-delayed or heavily retarded cement composition and may also accelerate the setting of the set-delayed, heavily retarded, or other cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400°

F., alternatively, in a range of from about 80° F. to about 250° F., and alternatively at a temperature of about 140° F.

Embodiments may include the addition of a cement set activator to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

Some embodiments may include a cement set activator comprising nanosilica. As used herein, the term "nanosilica" refers to silica having a particle size of less than or equal to about 100 nanometers ("nm"). The size of the nanosilica may be measured using any suitable technique. It should be understood that the measured size of the nanosilica may vary based on measurement technique, sample preparation, and sample conditions such as temperature, concentration, etc. One technique for measuring the particle size of the nanosilica is Transmission Electron Microscopy (TEM). An example of a commercially available product based on laser diffraction is the ZETASIZER Nano ZS particle size analyzer supplied by Malvern Instruments, Worcestershire, UK. In some embodiments, the nanosilica may comprise colloidal nanosilica. The nanosilica may be stabilized using any suitable technique. In some embodiments, the nanosilica may be stabilized with a metal oxide, such as lithium oxide, sodium oxide, potassium oxide, and/or a combination thereof. Additionally the nanosilica may be stabilized with an amine and/or a metal oxide as mentioned above. Embodiments of the nanosilicas have an additional advantage in that they have been known to fill in pore space in cements which can result in superior mechanical properties in the cement after it has set.

Some embodiments may include a cement set activator comprising a combination of a monovalent salt and a polyphosphate. The monovalent salt and the polyphosphate may be combined prior to addition to the set-delayed cement composition or may be separately added to the set-delayed cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for embodiments of the set-delayed cement compositions disclosed herein. The ratio of the monovalent salt to the polyphosphate may range, for example, from about 5:1 to about 1:25 or from about 1:1 to about 1:10. Embodiments of the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some embodiments, the combination of the monovalent salt and the polyphosphate may be mixed with a dispersant and water to form a liquid additive for activation of a set-delayed cement composition. Examples of suitable dispersants include, without limitation, the previously described dispersants, such as sulfonated-formaldehyde-based dispersants and polycarboxylated ether dispersants. One example of a suitable sulfonated-formaldehyde-based dispersant is a sulfonated acetone formaldehyde condensate, available from Halliburton Energy Services, Inc., as CFR-3™ dispersant. One example of a suitable polycarboxylated ether dispersant is Liquiment® 514L or 5581F dispersants, available from BASF Corporation, Houston, Tex.

The liquid additive may function as a cement set activator. As discussed above, a cement set activator may also accelerate the setting of the set-delayed or heavily retarded cement. The use of a liquid additive to accelerate a set-delayed or heavily retarded cement is dependent upon the compositional makeup of the liquid additive as well as the compositional makeup of the set-delayed or heavily retarded cement. With the benefit of this disclosure, one of ordinary skill in the art should be able to formulate a liquid additive to activate and/or accelerate a set-delayed or heavily retarded cement composition.

The formulation of the liquid additive is a delicate balance that correlates with the specific compositional makeup of the set-delayed cement composition. The amount of the monovalent salt and the polyphosphate must be carefully balanced in relation to the dispersant. A liquid additive with an irregular mixture of components may lead to a set-delayed cement composition with less than optimal rheology. In some embodiments, the liquid additive may be added to the set-delayed cement composition in an amount of from about 1% to about 20% by weight of the set-delayed cement composition and, alternatively, from about 1% to about 10% by weight of the set-delayed cement composition.

The monovalent salt may be present in the liquid additive in an amount of about 0.1% to about 30% by weight of the liquid additive. In specific embodiments, the polyphosphate may be present in an amount ranging between any of and/or including any of about 0.1%, about 1.0%, about 10%, or about 30% by weight of the liquid additive. With the benefit of this disclosure, one of ordinary skill in the art should be able to formulate a liquid additive with a sufficient amount of polyphosphate for a specific application.

The polyphosphate may be present in the liquid additive in an amount of about 0.1% to about 30% by weight of the liquid additive. In specific embodiments, the polyphosphate may be present in an amount ranging between any of and/or including any of about 0.1%, about 1.0%, about 10%, or about 30% by weight of the liquid additive. With the benefit of this disclosure, one of ordinary skill in the art should be able to formulate a liquid additive with a sufficient amount of polyphosphate for a specific application.

The dispersant may be present in the liquid additive in an amount of about 0.1% to about 90% by weight of the liquid additive. In specific embodiments, the dispersant may be present in an amount ranging between any of and/or including any of about 0.1%, about 1%, about 50%, or about 90% by weight of the liquid additive. With the benefit of this disclosure, one of ordinary skill in the art should be able to formulate a liquid additive with a sufficient amount of dispersant for a specific application.

The water may be present in the liquid additive in an amount of about 50% to about 90% by weight of the liquid additive. In specific embodiments, the water may be present in an amount ranging between any of and/or including any of about 50%, about 60%, about 75%, or about 90% by weight of the liquid additive. With the benefit of this disclosure, one of ordinary skill in the art should be able to formulate a liquid additive with a sufficient amount of water for a specific application.

In accordance with embodiments, the component ratio of the liquid additive may be relative to the makeup of the set-delayed cement composition. Whereby the amounts of the monovalent salt, polyphosphate, and the dispersant are therefore a function of the amounts of the lime, pumice, and sum total of the water (i.e. the water in the set-delayed cement composition and any water in the liquid additive) used in the activated cement composition.

Without being limited by theory, the main limitations in the formulation of the liquid additive are the solubility limits of the monovalent salt and the polyphosphate; and the amount of dispersant necessary to provide the cement with an acceptable rheology. The solubility limit is innate to the chosen monovalent salt and polyphosphate and therefore not alterable; however, the amount of dispersant is linked to the amounts of the monovalent salt and polyphosphate. The amounts of the monovalent salt/polyphosphate and the dispersant are in a pseudo direct relationship, whereby in a balanced formulation increasing the amount of one requires an increase in the amount of the other to maintain a balanced composition. For example, if the monovalent salt and the polyphosphate amounts are increased, the dispersant must also be increased or the cement composition will be too thick to pump. On the contrary, if the dispersant amount is increased, the cement composition will be too thin and the solid particulates may settle out of solution unless the amounts of the monovalent salt and the polyphosphate are also increased.

In some embodiments, the liquid additive should provide for a thickening time at wellbore conditions of greater than about 1 hour, alternatively, greater than about 2 hours, alternatively greater than about 5 hours. In some embodiments, the liquid additive may provide a thickening time at wellbore conditions of about four to about six hours. As described above, thickening time typically refers to the time a fluid, such as a cement composition, remains in a fluid state capable of being pumped. The liquid additive affects the rheology of the cement composition. Therefore, a liquid additive may affect the pump time of a cement. If cement rheology is not optimal the activated cement composition may be too thick or too thin, and therefore would be unsuitable for the desired pump time.

In some embodiments, the liquid additive may provide a set-delayed or heavily retarded cement with desirable 24-hour mechanical properties. Desirable mechanical properties include 24 hour compressive strength that is greater than 250 psi, a uniform density (i.e. no settling), and the absence of any free fluid.

Without being limited by theory, a description of a mechanism for activation of a lime and pumice set-delayed cement composition using a set-delayed cement activator comprising a combination of sodium sulfate and sodium hexametaphosphate is provided. It is believed that the sodium sulfate produces sodium hydroxide upon reaction with the lime. This reaction causes a resulting rise in the pH of the slurry and consequently an increase in the rate of dissolution of silicon dioxide. Cement hydration rate has a direct relationship with the proportion of free silicates and/or aluminosilicates. Sodium hexametaphosphate chelates and increases the dissolution rate of calcium hydroxide. The combination of sodium sulfate and sodium hexametaphosphate creates a synergy in various compositions of set-delayed cement compositions that provides better results than the singular use of either cement set activator.

The cement set activator may be added to embodiments of the set-delayed cement composition in an amount sufficient to induce the set-delayed cement composition to set into a hardened mass. In certain embodiments, the cement set activator may be added to the set-delayed cement composition in an amount in the range of about 0.1% to about 20% by weight of the pumice. In specific embodiments, the cement set activator may be present in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of cement set activator to include for a chosen application.

As will be appreciated by those of ordinary skill in the art, embodiments of the set-delayed cement compositions may be used in a variety of subterranean operations, including primary and remedial cementing. In some embodiments, a set-delayed cement composition may be provided that comprises water, pumice, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, the addition of a cement set activator to the set-delayed cement composition.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

In primary cementing embodiments, for example, embodiments of the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

An embodiment comprises a method of cementing comprising: providing a set-delayed cement composition comprising water, pumice, hydrated lime, and a set retarder; activating the set-delayed cement composition with a liquid additive to produce an activated cement composition, wherein the liquid additive comprises a monovalent salt, a polyphosphate, a dispersant, and water; and allowing the activated cement composition to set.

An embodiment comprises an activated cement composition comprising: water; pumice; hydrated lime; a set retarder; a monovalent salt; and a polyphosphate.

An embodiment comprises a cementing system comprising: a set-delayed cement composition comprising: water, pumice, hydrated lime, and a set retarder; and a liquid additive for activation of the set-delayed cement composition comprising: water, a monovalent salt, a polyphosphate, and a dispersant.

Referring now to FIG. 1, the preparation of a set-delayed cement composition in accordance with example embodiments will now be described. FIG. 1 illustrates a system 2 for the preparation of a set-delayed cement composition and subsequent delivery of the composition to a wellbore in accordance with certain embodiments. As shown, the set-delayed cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole. Additionally, batch mixer type units for the slurry may be plumbed in line with a separate tank containing a cement set activator. The cement set activator may then be fed in-line with the slurry as it is pumped out of the mixing unit.

Figure 2A:
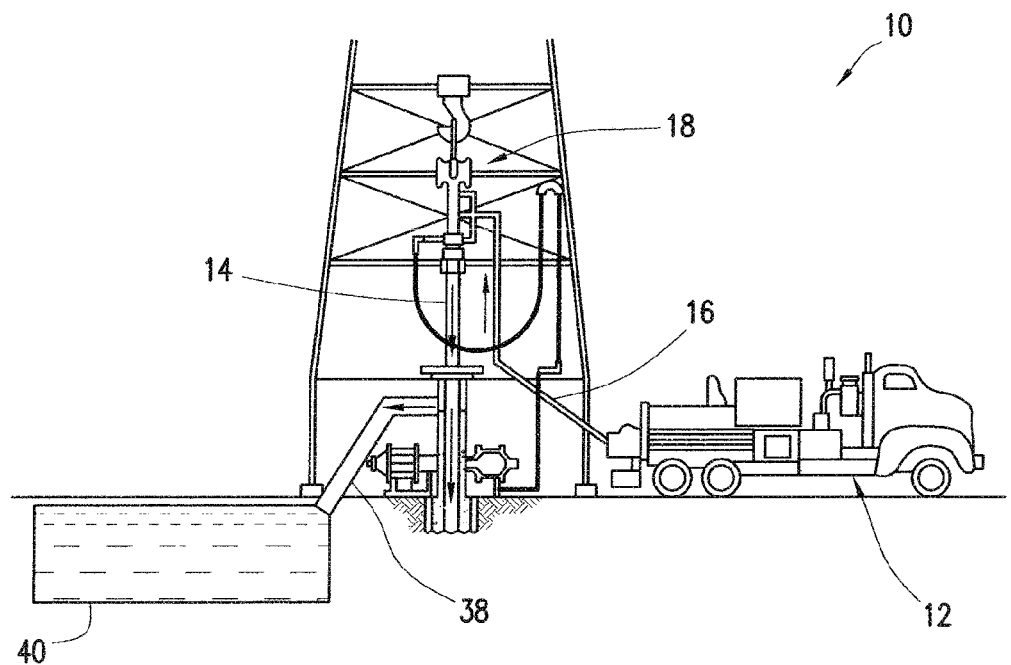
FIG. 2A illustrates surface equipment that may be used in the placement of a set-delayed cement composition in a wellbore in accordance with certain embodiments.

An example technique for placing a set-delayed cement composition into a subterranean formation will now be described with reference to FIGS. 2A and 2B. FIG. 2A illustrates surface equipment 10 that may be used in placement of a set-delayed cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a set-delayed cement composition 14 through a feed pipe 16 and to a cementing head 18 which conveys the set-delayed cement composition 14 downhole.

Figure 2B:
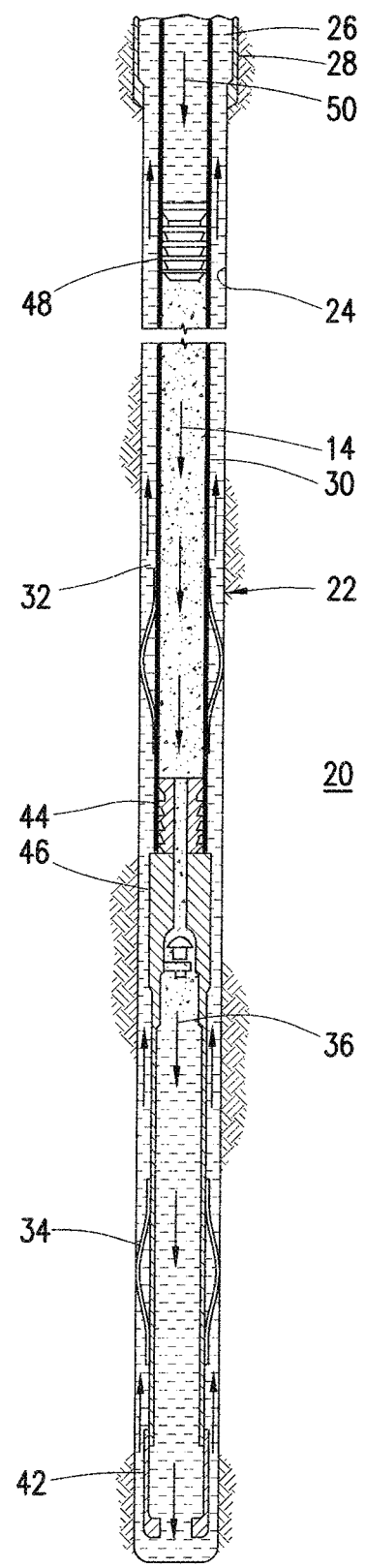
FIG. 2B illustrates the placement of a set-delayed cement composition into a wellbore annulus in accordance with certain embodiments.

Turning now to FIG. 2B, the set-delayed cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the set-delayed cement composition 14 may be pumped down the interior of the casing 30. The set-delayed cement composition 14 may be allowed to flow down the interior of the casing 30 through the casing shoe 42 at the bottom of the casing 30 and up around the casing 30 into the wellbore annulus 32. The set-delayed cement composition 14 may be allowed to set in the wellbore annulus 32, for example, to form a cement sheath that supports and positions the casing 30 in the wellbore 22. While not illustrated, other techniques may also be utilized for introduction of the set-delayed cement composition 14. By way of example, reverse circulation techniques may be used that include introducing the set-delayed cement composition 14 into the subterranean formation 20 by way of the wellbore annulus 32 instead of through the casing 30.

As it is introduced, the set-delayed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the set-delayed cement composition 14, for example, to separate the set-delayed cement composition 14 from the fluids 36 that may be inside the casing 30 prior to cementing. After the bottom plug 44 reaches the landing collar 46, a diaphragm or other suitable device should rupture to allow the set-delayed cement composition 14 through the bottom plug 44. In FIG. 2B, the bottom plug 44 is shown on the landing collar 46. In the illustrated embodiment, a top plug 48 may be introduced into the wellbore 22 behind the set-delayed cement composition 14. The top plug 48 may separate the set-delayed cement composition 14 from a displacement fluid 50 and also push the set-delayed cement composition 14 through the bottom plug 44.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLES

Example 1

The following example describes an example liquid additive composition for use with an example set-delayed cement composition. For this example, the liquid additive was added to the set delayed cement composition in the amount of 8% of the total mass of the combined hydrated lime and pumice. After activation, the activated set-delayed cement composition had a thickening time of 5.5 hours at 100° F. The thickening time was measuring using a pressurized consistometer at 100° F. in accordance with the procedure for determining cement thickening times set forth in API RP Practice 10B-2, *Recommended Practice for Testing Well Cements*, First Edition, July 2005. As discussed above, varying the concentration of the dispersant without adjusting the monovalent salt and polyphosphate to compensate may produce an activated slurry with less than optimal rheology and may alter the thickening time.

The example set-delayed cement composition comprised water; DS-325 lightweight aggregate pumice, available from Hess Pumice Products, Inc., Malad, Id.; hydrated lime; Liquiment 5581F® dispersant, available from BASF Corporation, Houston, Tex.; and Micro Matrix® cement retarder (MMCR), available from Halliburton Energy Services, Inc., Duncan, Okla. The compositional makeup is presented in Table 1 below. The amounts listed in Table 1 are shown as a percentage by weight of the pumice.

TABLE 1

Example Set-Delayed Cement Composition

| Component | % by weight of pumice |
|---|---|
| Water | 60 |
| Pumice | 100 |
| Hydrated Lime | 20 |
| Dispersant | 0.7 |
| Retarder | 1.26 |

The example liquid additive comprised water, a monovalent (sodium sulfate), a polyphosphate (sodium hexametaphosphate), and Liquiment 5581F® dispersant. The compositional makeup is presented in Table 2 below. The amounts listed are shown as a percentage of the total composition of the liquid additive.

TABLE 2

Example Liquid Additive

| Component | Weight % of Liquid Additive |
|---|---|
| Water | 68.7 |
| Monovalent Salt | 13.7 |
| Polyphosphate | 13.7 |
| Dispersant | 3.4 |

Example 2

In this example, a series of six liquid additive samples were prepared for use with an example set-delayed cement composition. The composition for the set-delayed cement composition is presented in Table 3 below. In Table 3, "% bwP" stands for "percentage by weight of pumice" and "gal/sk" stands for "gallons per sack 46 lb. sack of pumice."

The liquid additive comprised water, a monovalent salt (sodium sulfate), a polyphosphate (sodium hexametaphosphate), and Liquiment 5581F® dispersant. The water, monovalent salt, and polyphosphate amounts were held constant as shown in Table 4 below. The dispersant concentration was varied each of the six samples as shown in Table 5 below. The liquid additive from Table 4 was added to the set-delayed cement composition from Table 3 such that the liquid additive comprised 10% of the combined weight of the set-delayed cement composition and the liquid additive.

TABLE 3

Example Set-Delayed Cement Composition

| Component | Amount | Units |
|---|---|---|
| Water | 64.1 | % bwP |
| Pumice | 100 | % bwP |
| Hydrated Lime | 19.8 | % bwP |
| Coatex | 1.8 | % bwP |
| MMCR | 0.06 | gal/sk |
| MicroMax | 2.06 | % bwP |
| HR-5 | 0.516 | % bwP |

TABLE 4

Example Liquid Additive

| Component | Wt % of total sum of the water, monovalent salt, and the polyphosphate |
|---|---|
| Water | 83.33 |
| Monovalent Salt | 8.33 |
| Polyphosphate | 8.33 |
| Dispersant | X |

The dispersant amounts varied from a range of 0.00% to 4.3%. The rheology of the slurries also varied based on the amount of dispersant present since the monovalent salt and polyphosphate amounts were held constant. To reiterate, the dispersant amount is a percentage of the total activated composition. After preparation, the rheological properties of the samples were determined using a Model 35A Fann Viscometer and a No. 2 spring with a Fann Yield Stress Adapter, in accordance with the procedure set forth in API RP Practice 10B-2, *Recommended Practice for Testing Well Cements*. The data is presented in Table 5 below. The rheological data shown in Table 5 are apparent viscosity values measured at a hear rate of 100 (1/sec).

TABLE 5

Dispersant Amount vs. Rheology

| Sample # | Dispersant Amount | Rheology in centipoise |
|---|---|---|
| 1 | 0.00 | 2704 |
| 2 | 0.45 | 754 |
| 3 | 0.68 | 468 |
| 4 | 0.90 | 390 |
| 5 | 2.4 | 286 |
| 6 | 4.3 | 260 |

Example 2 illustrates that varying the dispersant amount, without compensating by adjusting the monovalent salt and the polyphosphate amounts, may create slurries with less than optimal rheologies.

Slurry Sample 1 from Table 5 was unworkable and was not pourable. Archimedes tests were performed for the remaining 5 slurries. In order to do the Archimedes tests, each of the samples was poured into 2"×4" cylinders and left to set at 140° F. for 24 hours. The set samples were then cut into three equally spaced parts along the length of the cylinders. Using the Archimedes principle of density and displacement, the densities of the samples were determined and recorded in units of lb/gal. The results are presented in Table 6 below.

TABLE 6

Sample Density Measurements

| Sample # | Top | Middle | Bottom |
|---|---|---|---|
| 1 | N/A | N/A | N/A |
| 2 | 11.71 | 11.78 | 11.84 |
| 3 | 12.11 | 12.14 | 12.18 |
| 4 | 12.3 | 12.3 | 12.4 |
| 5 | 12.19 | 12.19 | 12.20 |
| 6 | 12.06 | 12.3 | 12.7 |

Samples 2-5 had no significant settling issues. Sample 6 did display settling. In general, the more dispersant that is added, the less viscous the cement slurry will be. Sample 5 possessed the best slurry characteristics and would be the optimal choice compared to the other 5 samples on this measure alone. The other slurries could potentially be optimal when such factors as cost and early mechanical strength development are taken into account.

Example 3

The slurry composition presented in Table 3 above was used as an example set-delayed cement composition. The example liquid additive formulation, however, is different from the one presented in Table 4. Table 7 lists a new liquid additive formulation specific to this example.

TABLE 7

Example Liquid Additive

| Component | Wt % of total sum of the water, monovalent salt, and the polyphosphate |
|---|---|
| Water | 87.5 |
| Monovalent Salt | 6.25 |
| Polyphosphate | 6.25 |
| Dispersant | X |

Table 8 depicts the different values for the dispersant described in Table 7. Four different dispersant amounts were used. The dispersant concentration is a percentage of the total weight of the activated slurry. The dispersant amount ranged from 0.0% to 4.3%. After preparation, the rheological properties of the samples were determined using a Model 35A Fann Viscometer and a No. 2 spring with a Fann Yield Stress Adapter, in accordance with the procedure set forth in API RP Practice 10B-2, *Recommended Practice for Testing Well Cements*. The data is presented in Table 8 below. The rheological data shown in Table 8 are apparent viscosity values measured at a shear rate of 100 (1/sec).

TABLE 8

Dispersant Amount vs. Rheology

| Sample # | Dispersant Amount | Rheology in centipoise |
|---|---|---|
| 7 | 0.00 | 1274 |
| 8 | 0.45 | 416 |
| 9 | 0.68 | 312 |
| 10 | 4.3 | 234 |

Archimedes tests were performed for the 4 slurry samples. In order to do the Archimedes tests, each of the samples was cut into three equally spaced parts. Using the Archimedes principle of density and displacement, the densities of the samples were determined and recorded in units of lb/gal. The results are presented in Table 9 below.

TABLE 9

Densities of Samples Described in Table 8

| Sample # | Top | Middle | Bottom |
|---|---|---|---|
| 7 | 11.80 | 11.80 | 11.86 |
| 8 | 12.04 | 12.06 | 12.06 |
| 9 | 12.15 | 12.19 | 12.31 |
| 10 | 11.7 | 12.2 | 12.8 |

Significant settling occurred in Samples 9 and 10, representing 0.68% and 4.3% dispersant respectively. In comparison with Example 2, this indicates that reducing the amount of liquid additive added to the sample may also cause the optimum liquid additive dispersant concentration to change. Here the optimum concentration was 0.45% dispersant, whereas in the previous example the optimum concentration was 2.4%.

Example 4

In this example, the slurry described in Table 3 was used for the base composition. The liquid additive formulation is described in Table 10 below. The monovalent salt was sodium sulfate. The polyphosphate was sodium hexametaphosphate. The dispersant was Coatex 1702, available from Coatex Inc., Chester, S.C. As illustrated in Table 11, the dispersant concentration varied from 0.45% to 8.33%.

TABLE 10

Example Liquid Additive

| Component | Wt % of total sum of the water, monovalent salt, and the polyphosphate |
|---|---|
| Water | 76.9 |
| Monovalent Salt | 11.5 |
| Polyphosphate | 11.5 |
| Dispersant | X |

TABLE 11

Dispersant Concentration per Sample

| Sample Number | Dispersant Amount (g) | Wt % of total sum of the water, monovalent salt, and the polyphosphate |
|---|---|---|
| 1 | 5 | 0.45 |
| 2 | 15 | 1.35 |
| 3 | 30 | 2.65 |
| 4 | 70 | 5.98 |
| 5 | 100 | 8.33 |

TABLE 11-continued

In order to determine the effect of varying the dispersant concentration on the compressive strength of set samples, the compressive strength of each sample was measured after five days. The destructive compressive strength was measured by allowing the samples to cure in a 2" by 4" plastic cylinder that was placed in a water bath at 190° F. to form set cylinders. Immediately after removal from the water bath, destructive compressive strengths were determined using a mechanical press in accordance with API RP 10B-2, *Recommended Practice for Testing Well Cements*. The results of this test are set forth below in Table 12, in units of psi. The reported compressive strengths are an average for two cylinders of each sample.

TABLE 12

Compressive Strength Tests

| Sample Number | Compressive Strength (psi) |
|---|---|
| 1 | 964 |
| 2 | 778 |
| 3 | 398 |
| 4 | 411 |
| 5 | 34 |

Varying the dispersant concentration had a direct impact on the compressive strength of the samples. This effect was stronger than the settling effect of adding dispersant. It therefore stands to reason that the dispersant can have an antagonistic effect on the sodium hexametaphosphate activation of the extended life slurry when retarded with the phosphonate, nitrilotrismethylenetriphosphonic acid.

Archimedes tests were performed for Samples 1-5. Each of the samples was poured into 2"×4" cylinders and left to set at 140° F. for five days. The set samples were then cut into three equally spaced parts along the length of the cylinders. Using the Archimedes principle of density and displacement, the densities of the samples were determined and recorded. The results are presented in Tables 13-17 below, where PPG is the symbol for units of lb/gal.

TABLE 13

Sample 1 Archimedes Test

| | Volume (mL) | Weight (g) | Density (g/mL) | Density (PPG) |
|---|---|---|---|---|
| Top | 65.96 | 99.18 | 1.5036 | 12.5 |
| Middle | 60.55 | 91.12 | 1.5049 | 12.5 |
| Bottom | 64.29 | 96.45 | 1.5002 | 12.5 |

TABLE 14

Sample 2 Archimedes Test

| | Volume (mL) | Weight (g) | Density (g/mL) | Density (PPG) |
|---|---|---|---|---|
| Top | 54.31 | 81.58 | 1.5021 | 12.5 |
| Middle | 67.38 | 100.97 | 1.4985 | 12.5 |
| Bottom | 54.18 | 81.53 | 1.5048 | 12.5 |

TABLE 15

Sample 3 Archimedes Test

|  | Volume (mL) | Weight (g) | Density (g/mL) | Density (PPG) |
|---|---|---|---|---|
| Top | 60.56 | 90.98 | 1.5023 | 12.5 |
| Middle | 57.44 | 85.84 | 1.4944 | 12.4 |
| Bottom | 61.3 | 91.8 | 1.4976 | 12.5 |

TABLE 16

Sample 4 Archimedes Test

|  | Volume (mL) | Weight (g) | Density (g/mL) | Density (PPG) |
|---|---|---|---|---|
| Top | 60.63 | 89.53 | 1.4767 | 12.3 |
| Middle | 58.83 | 87.83 | 1.4929 | 12.4 |
| Bottom | 62.12 | 93.05 | 1.4979 | 12.5 |

TABLE 17

Sample 5 Archimedes Test

|  | Volume (mL) | Weight (g) | Density (g/mL) | Density (PPG) |
|---|---|---|---|---|
| Top | 64.04 | 94.09 | 1.4692 | 12.2 |
| Middle | 56.47 | 82.6 | 1.4627 | 12.2 |
| Bottom | 59.5 | 87.91 | 1.4775 | 12.3 |

Samples 4 and 5 displayed slight settling behavior.

Example 5

In this example, ten sample liquid additives were prepared for use with a set-delayed cement composition. The compositional makeup of the set-delayed cement composition is presented in Table 18 below. The liquid additive comprised water, a monovalent salt in the form of sodium sulfate, a polyphosphate in the form of sodium hexametaphosphate, and Liquiment 5581F® dispersant. It should be noted that the percentages of the monovalent salt and the polyphosphate were held constant throughout the experiment while the dispersant concentration was varied. The composition of the liquid additive is illustrated below in Table 19. All of the listed amounts are shown as a percentage of the total composition of the liquid additive. The liquid additive from Table 19 was added to the set-delayed cement composition described in Table 18 such that the monovalent salt and polyphosphate were present in the combined amount of 1.25% bwP or 1.00% bwP.

TABLE 18

Example Set-Delayed Cement Composition

| Component | Amount | units |
|---|---|---|
| Water | 60.0 | % bwP |
| Pumice | 100.0 | % bwP |
| Hydrated Lime | 20 | % bwP |
| Liquiment 5581F | 0.6 | % bwP |
| MMCR | 0.06 | gal/sk |
| MicroMax | 2.0 | % bwP |
| HR-5 | 0.5 | % bwP |
| SA-1015 | 0.035 | % bwP |

TABLE 19

Example Liquid Additive

| Component | Wt % of total sum of the water, monovalent salt, and the polyphosphate |
|---|---|
| Water | 81.59 |
| Monovalent Salt | 8.53 |
| Polyphosphate | 8.53 |
| Dispersant | X |

The dispersant amount varied from a range of 0.10% to 1.39%. The thickening time of the slurries varied based on the amount of dispersant, since the monovalent salt and polyphosphate were held constant.

The compressive strength and thickening times of each sample were measured. The destructive compressive strength was measured by allowing the samples to cure in a 2" by 4" plastic cylinder that was placed in a water bath at 190° F. to form set cylinders. Immediately after removal from the water bath, destructive compressive strengths were determined using a mechanical press in accordance with API RP 10B-2, *Recommended Practice for Testing Well Cements*. The results of this test are set forth in Table 20 below. The reported compressive strengths are an average for three cylinders of each sample.

TABLE 20

Dispersant Amount vs. Thickening Time and Compressive Strength

| Sample Number | Monvalent Salt and Polyphosphate Amount (% bwP) | Dispersant Amount (% bwP) | Thickening Time (hr:min) | Compressive Strength (psi) |
|---|---|---|---|---|
| 1 | 1.25 | 0.10 | 1:59 | 1047 |
| 2 | 1.25 | 0.23 | 2:18 | — |
| 3 | 1.25 | 0.49 | 2:54 | — |
| 4 | 1.25 | 0.88 | 3:51 | 741 |
| 5 | 1.25 | 1.15 | 4:07 | 824 |
| 6 | 1.25 | 1.41 | 4:53 | 1146 |
| 7 | 1.00 | 0.08 | 2:46 | 1201 |
| 8 | 1.00 | 0.87 | 4:44 | 1066 |
| 9 | 1.00 | 1.13 | 4:48 | 635 |
| 10 | 1.00 | 1.39 | 11:17 | 672 |

Figure 3:
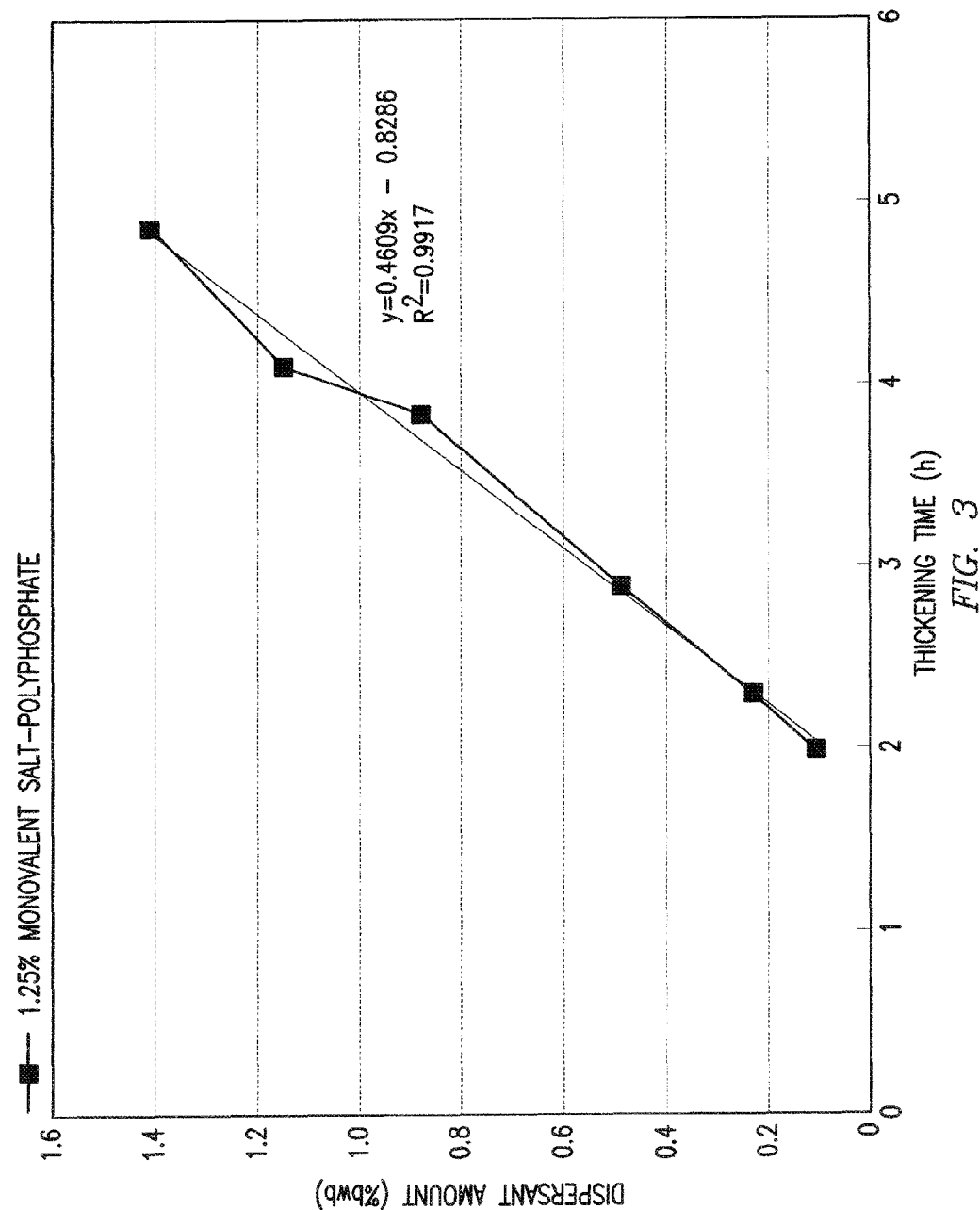
FIG. 3 is a graph of the dispersant amount vs. the thickening time of set-delayed cement compositions activated with a liquid additive comprising a monovalent salt and polyphosphate activator combination.

Varying the dispersant concentration of the liquid additive allowed the thickening time of the set-delayed cement composition to be controlled. This added benefit was realized through the observation that the thickening time of the cement samples increased with increasing dispersant amount. For the liquid additive samples containing 1.25% bwP monovalent salt-polyphosphate, the relationship is almost linear as shown in FIG. 3.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of making an activated cement composition, the method comprising:
   providing a set-delayed cement composition comprising:
      water;
      pumice;
      hydrated lime;
      a set retarder selected from the group consisting of diethylenetriaminepentamethylenephosphonate, nitrilotrismethylenetriphosphonate, methylene phosphonates, methylene phosphonic acid derivatives, and combinations thereof; and
   adding a liquid activator to the set-delayed cement composition, wherein the liquid activator comprises water, a dispersant, a monovalent salt, and a polymeric metaphosphate salt.

2. The method of claim 1 wherein the polymeric metaphosphate salt comprises sodium hexametaphosphate.

3. The method of claim 1 wherein the monovalent salt comprises sodium sulfate.

4. The method of claim 1 wherein the dispersant comprises a polycarboxylated ether dispersant.

5. A method of making an activated cement composition, the method comprising:
   providing a set-delayed cement composition comprising:
      water;
      pumice;
      hydrated lime; and
      a set retarder selected from the group consisting of diethylenetriaminepentamethylenephosphonate, nitrilotrismethylenetriphosphonate, methylene phosphonates, methylene phosphonic acid derivatives, and combinations thereof;
   storing the set-delayed cement composition in a pumpable fluid state for at least about one day; and
   adding a liquid activator to the set-delayed cement composition, wherein the liquid activator comprises water, a dispersant, a polymeric metaphosphate salt and monovalent salt.

6. The method of claim 5, wherein the dispersant is present in an amount in a range of about 0.01% to about 5% by weight of pumice.

7. The method of claim 5 wherein the set retarder is present in an amount in a range of about 0.01% to about 10% by weight of pumice.

8. The method of claim 5 wherein the hydrated lime is present in a range of about 10% to about 100% by weight of pumice.

9. The method of claim 5 wherein the water is present in an amount in the range of about 33% to about 200% by weight of pumice.

10. The method of claim 5 wherein the polymeric metaphosphate salt comprises sodium hexametaphosphate.

11. The method of claim 5 wherein a pumice-to-hydrated-lime weight ratio of about 10:1 to about 1:1.

12. The method of claim 5 wherein the water is present in an amount sufficient to form a pumpable slurry.

13. The method of claim 5 wherein a ratio of the monovalent salt to the polymeric metaphosphate salt is about 5:1 to about 1:25.

14. An activated cement composition comprising:
   water;
   pumice;
   hydrated lime;
   a set retarder selected from the group consisting of diethylenetriaminepentamethylenephosphonate, nitrilotrismethylenetriphosphonate, methylene phosphonates, methylene phosphonic acid derivatives, and combinations thereof; and
   a liquid activator, wherein the liquid activator comprises water polymeric metaphosphate salt, a dispersant, and a monovalent salt.

* * * * *